(12) United States Patent
Sasaki

(10) Patent No.: US 8,495,752 B2
(45) Date of Patent: Jul. 23, 2013

(54) AV SERVER DEVICE, TV RECEIVER INCORPORATING AV SERVER AND PERSONAL COMPUTER INCORPORATING AV SERVER

(75) Inventor: Jun Sasaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 590 days.

(21) Appl. No.: 12/678,699

(22) PCT Filed: Apr. 4, 2008

(86) PCT No.: PCT/JP2008/056751
§ 371 (c)(1),
(2), (4) Date: Jul. 29, 2010

(87) PCT Pub. No.: WO2009/037882
PCT Pub. Date: Mar. 26, 2009

(65) Prior Publication Data
US 2010/0284669 A1    Nov. 11, 2010

(30) Foreign Application Priority Data
Sep. 18, 2007  (JP) ................................. 2007-241108

(51) Int. Cl.
*G06F 17/30* (2006.01)
*H04L 9/32* (2006.01)
*G06F 15/16* (2006.01)
*H04M 11/00* (2006.01)

(52) U.S. Cl.
USPC ............... 726/30; 726/28; 713/170; 709/217; 709/229; 455/407

(58) Field of Classification Search
USPC .......... 713/168–174, 182–186, 202; 709/225, 709/229; 726/2–8
See application file for complete search history.

(56) References Cited

U.S. PATENT DOCUMENTS

| 2004/0143622 A1 | 7/2004 | Hirabayashi et al. | |
| 2007/0009232 A1* | 1/2007 | Muraki et al. | 386/95 |
| 2012/0157043 A1* | 6/2012 | LaJoie et al. | 455/407 |

FOREIGN PATENT DOCUMENTS

| JP | 2004-193791 A | 7/2004 |
| JP | 2004-222044 A | 8/2004 |
| JP | 2006-5726 A | 1/2006 |
| JP | 2006-209275 A | 8/2006 |
| WO | WO 2005/020234 A1 | 3/2005 |

* cited by examiner

*Primary Examiner* — Evans Desrosiers
(74) *Attorney, Agent, or Firm* — Birch, Stewart, Kolasch & Birch, LLP

(57) ABSTRACT

There is provided an AV server device in a home network for enabling transmission/reception of an AV content between digital AV apparatuses connected with communication interfaces of different standards while protecting copyright. The AV server device includes an HDD (11) for recording a content and its attribute information; a format conversion portion (12) for converting the format of the content; and a plurality of communication interfaces (13, 14) for transmitting/receiving a content to/from an external apparatus through the HDD (11). When receiving a reproduction and output request of a content from the external apparatus, a CPU (16) judges whether the content can be reproduced or not based on the standard information and copyright protection information of the communication interface of a recording source included in the attribute information of the content, existence of authentication of copyright protection, and the standard information of the communication interface of reproduction output destination, and then delivers a content which can be reproduced and output after performing data conversion thereof to a format which can be received by the external apparatus of a request source.

13 Claims, 12 Drawing Sheets

FIG. 2
(A)
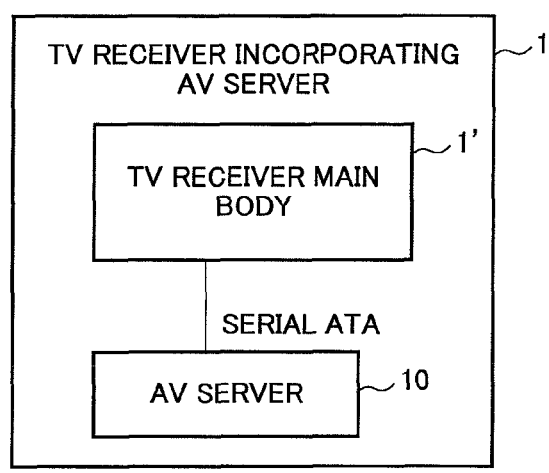
(B)
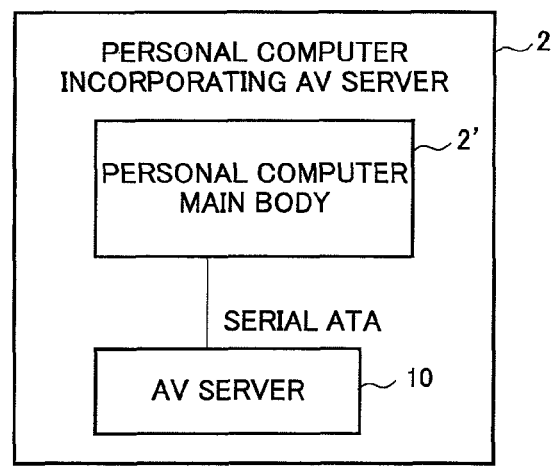

FIG. 5
(A)
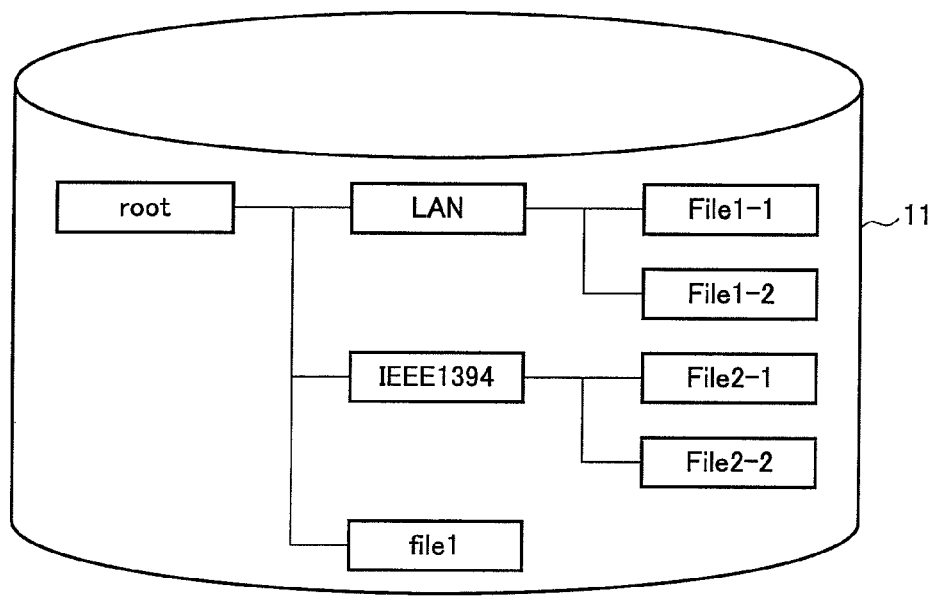
(B)
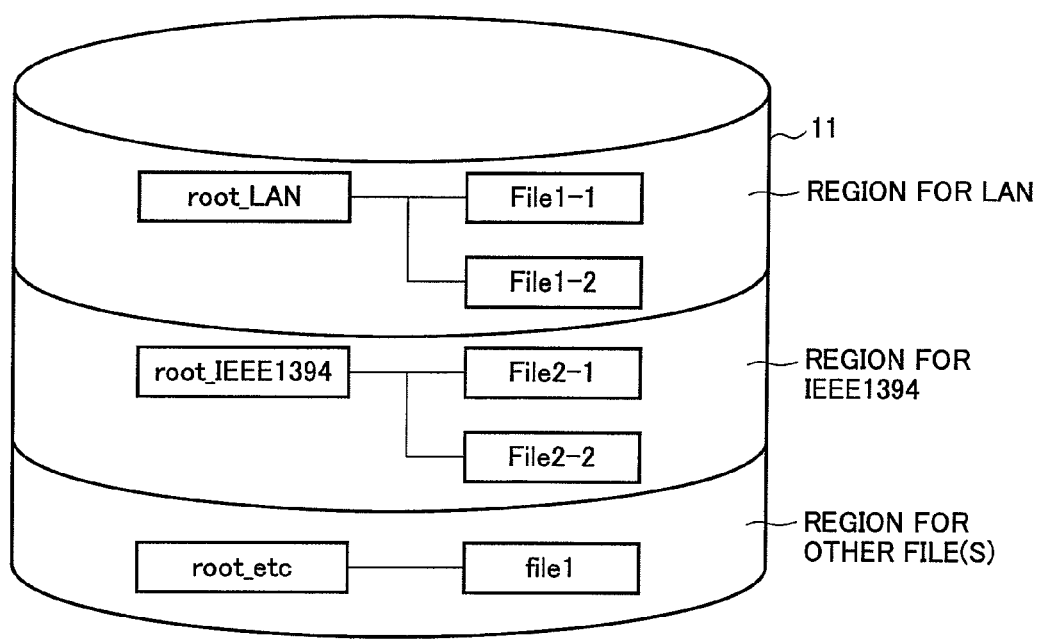

FIG. 6

EXAMPLE OF ATTRIBUTE TO BE ADDED TO LIST INFORMATION OF CONTENT

| FILE NAME | RECORDING SOURCE | FORMAT | COPYRIGHT INFORMATION | AUTHENTICATION METHOD |
|---|---|---|---|---|
| File1-1 | LAN | MPEG4 | COPYING PERMITTED | NOTHING |
| File1-2 | LAN | MPEG2-PS | COPYING NOT-PERMITTED | IP-DTCP |
| File2-1 | IEEE1394 | MPEG2-TS | COPYING NOT-PERMITTED | DTCP |
| File2-2 | IEEE1394 | MPEG2-TS | COPYING PERMITTED | NOTHING |
| File1 | USB | MPEG4 | COPYING PERMITTED | NOTHING |

FIG. 7

EXAMPLE OF JUDGING WHETHER OR NOT OUTPUT IS PERMITTED FROM RECORDING SOURCE AND OUTPUT DESTINATION

| RECORDING SOURCE | OUTPUT DESTINATION | DTCP-IP AUTHENTICATION | COPYRIGHT PROTECTION INFORMATION | JUDGING RESULT OF WHETHER OR NOT OUTPUT IS PERMITTED (OK or NG) |
|---|---|---|---|---|
| IEEE1394 | IEEE1394 | AUTHENTICATED | COPYING NOT-PERMITTED | OK |
| | | | ONLY ONCE | OK |
| | | | FREE | OK |
| IEEE1394 | IEEE1394 | NOT AUTHENTICATED | COPYING NOT-PERMITTED | NG |
| | | | ONLY ONCE | NG |
| | | | FREE | OK |
| IEEE1394 | LAN | AUTHENTICATED | COPYING NOT-PERMITTED | OK |
| | | | ONLY ONCE | OK |
| | | | FREE | OK |
| IEEE1394 | LAN | NOT AUTHENTICATED | COPYING NOT-PERMITTED | NG |
| | | | ONLY ONCE | NG |
| | | | FREE | OK |
| LAN | LAN | NOT AUTHENTICATED | COPYING NOT-PERMITTED | NG |
| | | | ONLY ONCE | NG |
| | | | FREE | OK |

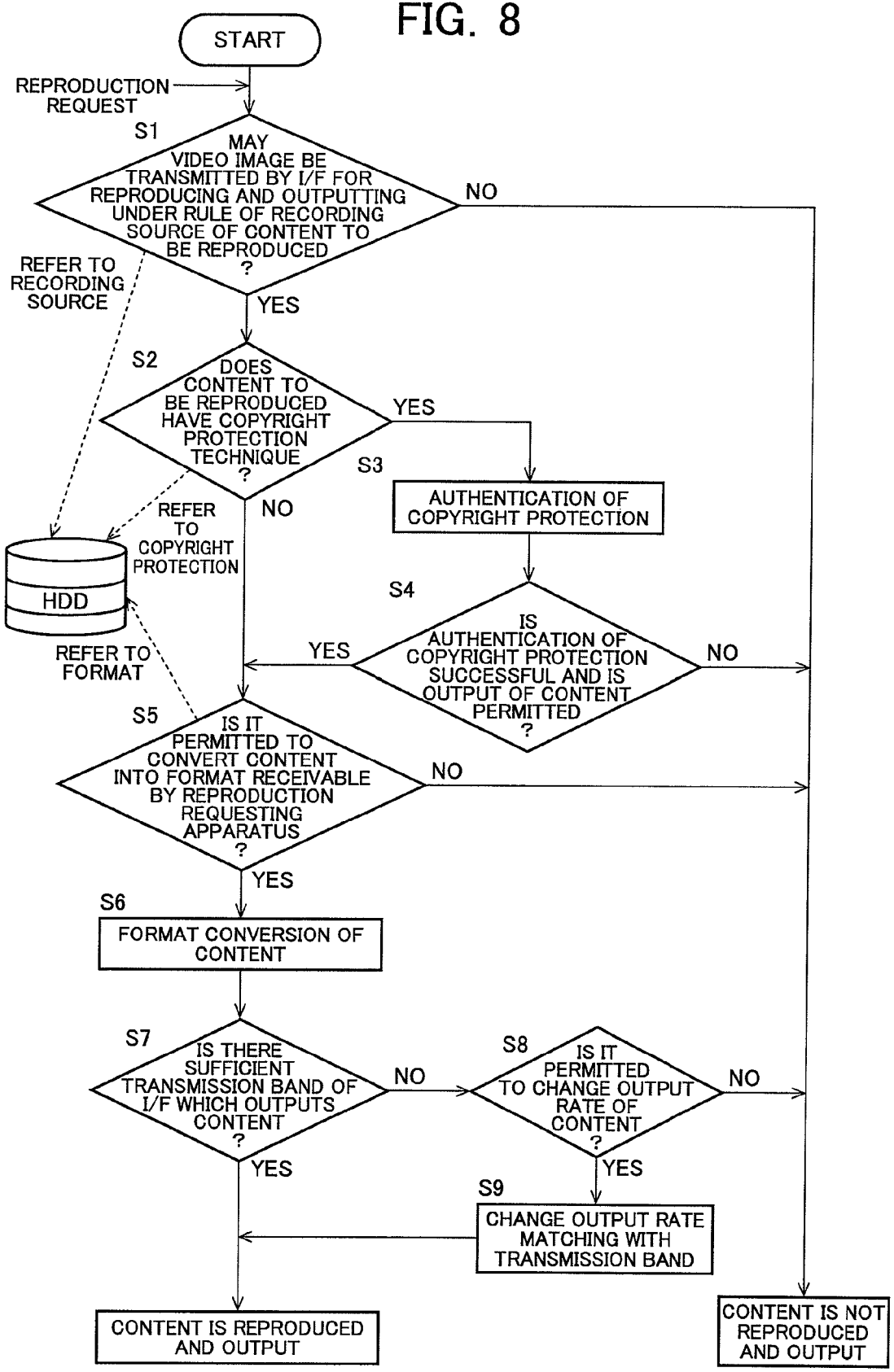

FIG. 12

ORIGINAL CONTENT LIST

| FILE NAME (TITLE) | RECORDING SOURCE | COPYRIGHT INFORMATION | FORMAT | Etc |
|---|---|---|---|---|
| Jun | IEEE1394 | COPYING NOT-PERMITTED | MPEG2-TS | ... |
| Sasaki | LAN | COPYING NOT-PERMITTED | MPEG4 | ... |
| Sharp | IEEE1394 | COPYING PERMITTED | MPEG2-TS | ... |
| Makuhari | etc | COPYING PERMITTED | FILE | ... |
| DegitalAV | LAN | COPYING PERMITTED | MPEG2-PS | ... |

⇩ ( DELETE TITLE INFORMATION WHOSE RECORDING SOURCE IS IEEE1394, AND REGENERATE CONTENT LIST INFORMATION FOR PRESENTING TO OUTSIDE )

ORIGINAL CONTENT LIST

| FILE NAME (TITLE) | RECORDING SOURCE | COPYRIGHT INFORMATION | FORMAT | Etc |
|---|---|---|---|---|
| Sasaki | LAN | COPYING NOT-PERMITTED | MPEG4 | ... |
| Makuhari | etc | COPYING PERMITTED | FILE | ... |
| DegitalAV | LAN | COPYING PERMITTED | MPEG2-PS | ... |

AV SERVER DEVICE, TV RECEIVER INCORPORATING AV SERVER AND PERSONAL COMPUTER INCORPORATING AV SERVER

TECHNICAL FIELD

The present invention relates to an AV server device in a home network used for transmitting/receiving an AV content between digital AV apparatuses respectively connected with communication interfaces having standards different from each other while seeking to protect copyright, a TV receiver incorporating the AV server which incorporates the AV server, and a personal computer incorporating the AV server.

BACKGROUND OF THE INVENTION

In order to enable a home network to deal with an AV content of digital broadcasting, etc., a measure for copyright protection on a network is necessary. In the digital broadcasting, a content protection rule is prescribed under a broadcasting operation rule of the ARIB (Association of Radio Industries and Businesses), and for dealing with the digital broadcasting in the home network, it is necessary to conform to a standard thereof.

When recording video image data with a copyright protection technique on IEEE1394 which is a representative digital network connecting digital AV apparatuses, it is normal to perform real-time transmission of MPEG2-TS. In addition, when recording on HDD on LAN, there exist various methods such as streaming or transfer by a file, however, a measure for copy right protection has been fragile. However, a technique called DTCP-IP (Digital Transmission Content Protection over Internet Protocol) is established recently, and streaming and transfer of a file is possible through a LAN by strictly taking in a copyright protection technique. Moreover, DLNA (Digital Living Network Alliance) which is a technical specifications for interconnecting an AV apparatus, a personal computer, and home information appliances using a home LAN (home network) and utilizing in association therewith is formulated, and a DLNA-compliant apparatus is available from other apparatus automatically only by connecting with a network, thus capable of transmitting/receiving a content.

However, an apparatus which is not compliant with the DLNA, for example, has not come to be able to record a video image with a high image quality received by a digital TV device on an HDD through a LAN. As a technique that enables transmission and reception of AV data in different formats by protecting copyright, there is one in which either of a packet generated by packetization processing means or a packet made to be used in Ethernet (registered trademark) without using a transfer protocol on an IP is transmitted or received (Japanese Laid-Open Patent Publication No. 2004-193791).

In addition, recently, it is possible to view a video image through a LAN in IP broadcasting on television, however, since a technique for recording by applying strict copyright protection technique even when recording the MPEG2-TS received by the IP broadcasting is not established, it is possible to record through the IEEE 1394 easily.

DISCLOSURE OF THE INVENTION

Problems to be Solved by the Invention

Users of digital AV apparatuses desire to easily view a video image recorded through the LAN and digital broadcasting recorded through the IEEE1394, similarly. However, video image data recorded on the HDD by the IEEE1394 can be output only through the IEEE1394 in view of copyright protection, and a content recorded through the LAN can be viewed only though the LAN. Interconnectivity between the IEEE 1394 and the LAN has been discussed, however, the discussion has been preoccupied with that how to encapsulate an IP packet to the IEEE1394 and how to encapsulate an IEEE 1394 packet to the LAN and perform communication, and mechanism is extremely complicated, thus being in a difficult situation for commercialization in view of reliability of mounting and communication.

In view of such a current situation, the present invention aims to provide an AV server device for a home network, a TV receiver incorporating the AV server which incorporates the AV server, and a personal computer incorporating the AV server which enables, for example, an isochronous transfer of a content temporarily recorded in recording means with a copyright protection technique by DTCP which is a mandatory function of the IEEE1394 standard in the case of IEEE1394, and a transfer in accordance with a rule of the LAN standard in the case of the LAN.

Means for Solving the Problems

In order to solve the above problem, a first invention of the present application is an AV server device to which a plurality of external apparatuses are connected, including a content recording portion for recording content information received from the external apparatuses, and outputting the content information recorded in the recording portion for a request from the external apparatuses to the external apparatuses, comprising: at least two or more different communication interfaces having a copyright protection authentication function to which the external apparatuses are connected; a control portion for recording the received content and attribute information including at least information of a standard of a communication interface of a recording source of the content, presence/absence of copyright protection information, and an authentication method of copyright protection if there is copyright protection (DRM), and for judging whether or not reproduction is possible based on the attribute information according to specification information of a communication interface extracted from the external apparatuses information, the authentication method of copyright protection (DRM), and a content to be reproduced for a reproduction request from the external apparatuses, wherein in a case where reproduction and output is possible in the information of standards of communication interfaces of the both and where copyright protection authentication is further successful if there is copyright protection, reproduction and output is performed.

A second invention is the AV server device of the first invention further comprising; a format conversion portion which converts formats of a received content and a content to be transmitted according to an instruction from the control portion in transmitting/receiving the contents.

A third invention is the AV server device of the second invention, wherein the format conversion portion converts the content to be transmitted into a format which can be received by an output requesting apparatus.

A fourth invention is the AV server device of the second or third invention, wherein, the format conversion portion further has a function of performing rate conversion conforming to a transmission band of an output destination according to an instruction from the control portion.

A fifth invention is the AV server device of any one of the first to third inventions, wherein the two or more communication interfaces conform to an IEEE1394 standard and a DLNA standard.

A sixth invention is the AV server device of any one of the first to third inventions, wherein when a format of a content received from the external apparatuses is MPEG2-TS, the content is recorded directly in the content recording portion.

A seventh invention is the AV server device of any one of the first to third inventions, wherein when a format of a content received from the external apparatuses is the MPEG2-TS, the content is converted into a predetermined format in the format conversion portion, and then recorded in the content recording portion.

An eighth invention is the AV server device of any one of the first to third inventions, wherein when a format of a content received from the external apparatuses is other than the MPEG2-TS, the content is recorded directly in the content recording portion.

A ninth invention is the AV server device of any one of the first to third inventions, wherein when a format of a content received from the external apparatuses is other than the MPEG2-TS, the content is converted into a predetermined format in the format conversion portion, and then recorded in the content recording portion.

A tenth invention is the AV server device of any one of the first to third inventions, wherein a communicate interface which conforms to any one of a USB standard, an IDE/ATA standard, a serial ATA standard, and an SCSI standard or a plurality of the standards is further included as a communication interface to which external apparatuses are connected.

An eleventh invention is the AV server device of any one of the first to third inventions, wherein when there is a request for presenting the content information recorded in the content recording portion and a list of the attribute information according to the content from the external apparatuses connected through the communication interface, the control portion outputs only the list information according to a content which is receivable in communication interface standard rule information based on the external apparatus information.

A twelfth invention is a TV receiver incorporating an AV server incorporating any one of the AV server devices of the first to third inventions.

A thirteenth invention is a personal computer incorporating an AV server incorporating any one of the AV server devices of the first to third inventions.

Effects of the Invention

According to the present invention, it is possible to view a video image received by a TV receiver, while keeping a high quality, on a television device placed in other room or on a personal computer through a LAN. In addition, it is possible to view a video image obtained from the personal computer or a network though the LAN on a television device having only an existing IEEE 1394 terminal without adding a new terminal or function while keeping high quality.

BRIEF DESCRIPTION OF DRAWINGS

FIG. 2 (A) is a diagram showing a utilization form in which the AV server device is incorporated in a TV receiver to be a TV receiver incorporating the AV server, and (B) is a diagram showing a utilization form in which the AV server device is incorporated in a personal computer to be a personal computer incorporating the AV server.

FIG. 5 (A) and (B) are diagrams showing a recording form of a content recorded in an HDD, respectively.

FIG. 6 is a diagram showing one example of attribute information that is added to list information of a content.

FIG. 7 is an explanatory diagram showing an example as to a condition to judge whether or not reproduction and output conformed to the DTCP-IP is possible from attribute information of a content and a type of an output destination interface.

FIG. 8 is a flowchart showing one example as to processing at the time of reproduction.

FIG. 12 is a diagram showing an example of a content list that is presented to outside.

EXPLANATIONS OF REFERENCE NUMERALS

10 . . . AV server device; 11 . . . HDD; 12-1, 12-2 . . . format conversion portion; 12a, 12b, 12c . . . changing-over switch; 13 . . . communication interface (LAN); 13-1 . . . NIC; 13-2 . . . DTCP-IP module; 13a, 13b . . . changing-over switch; 14 . . . communication interface (IEEE1394); 15 . . . communication interface (USB); 16 . . . CPU; 17 . . . LAN terminal; 18 . . . IEEE 1394 terminal; and 19 . . . USB terminal.

PREFERRED EMBODIMENTS OF THE INVENTION

Example 1

Description will hereinafter be given for preferred embodiments of the present invention with reference to attached figures.

Figure 1:
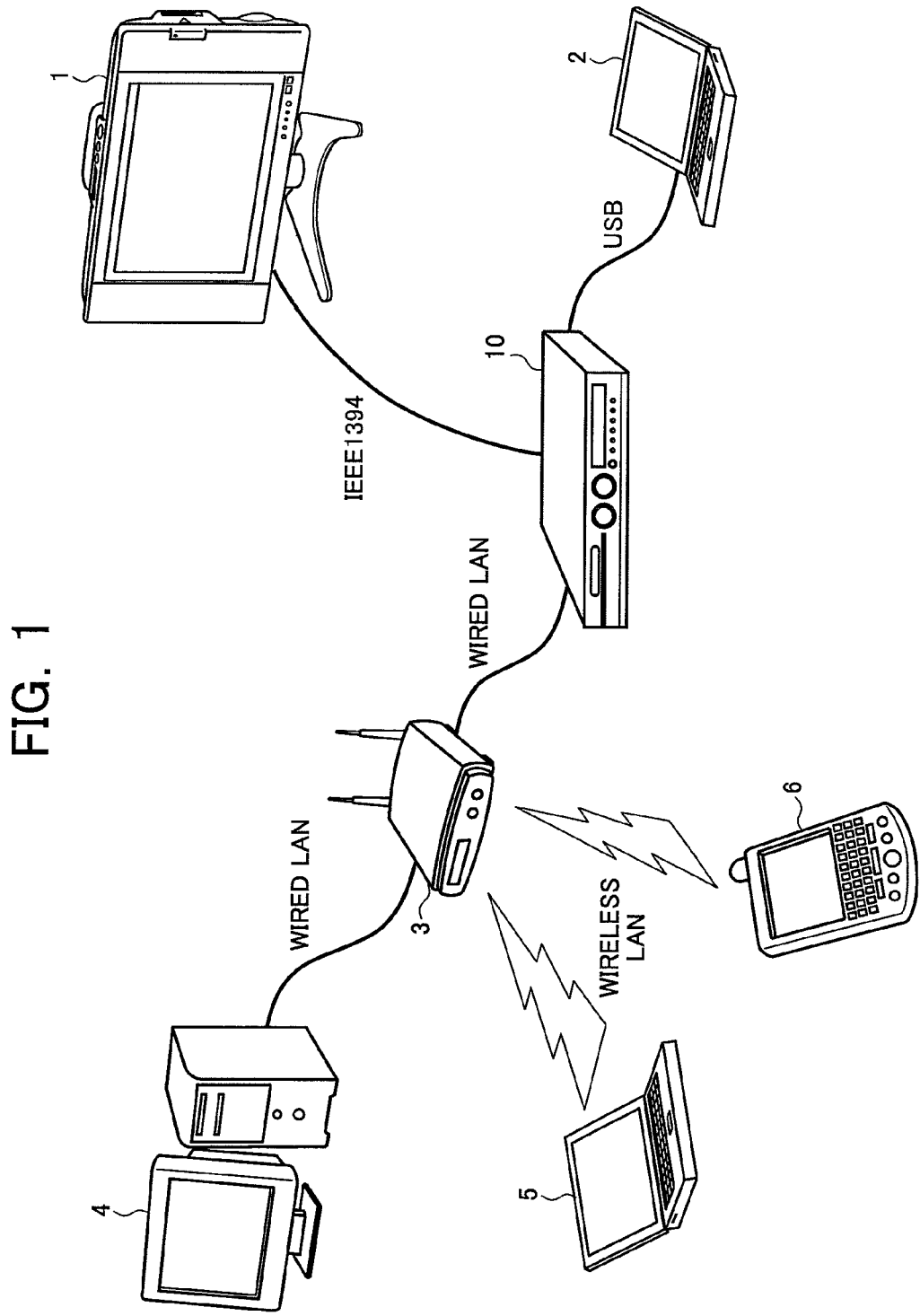
FIG. 1 is a diagram showing one example of a home network transfer system using an AV server device of the present invention.

FIG. 1 shows an example of connecting home digital information apparatuses such as a digital TV and personal computers to an AV server device through a communication cable or wireless communication corresponding to an interface of each standard, and indicates a state which a digital TV receiver 1 is connected through an IEEE1394 cable, a laptop computer 2 through a USB cable, and a LAN hub/wireless base station 3 through a LAN cable, respectively to an AV server device 10 of the present invention incorporating an HDD for recording a content and provided with a plurality of communication interfaces whose standards are different from each other, and a desktop personal computer 4 is connected through a LAN cable, a laptop personal computer 5 and a PDA 6 through wireless LAN, respectively, to the LAN hub/wireless base station 3.

Other utilization forms of the AV server device 10 may include a form in which the AV server device 10 is incorporated in a TV receiver and connected to a TV receiver main body 1' with a serial ATA to be a TV receiver incorporating the AV server 1 as shown in FIG. 2, and a form in which the AV server device 10 is incorporated in a personal computer and connected to a personal computer main body 2' with a serial ATA to be a personal computer incorporating the AV server 2 as shown in (B).

When meeting a predetermined condition which will be described below in a combination with such various digital information apparatuses, the present invention makes it possible to view a digital video image being received by the digital TV receiver 1 on a desktop personal computer 4 which is connected to the LAN through the AV server device 10. Note that, in a form independently utilizing the AV server device 10 which also functions as an external HDD, a TV tuner may be incorporated in the device 10.

Figure 3:
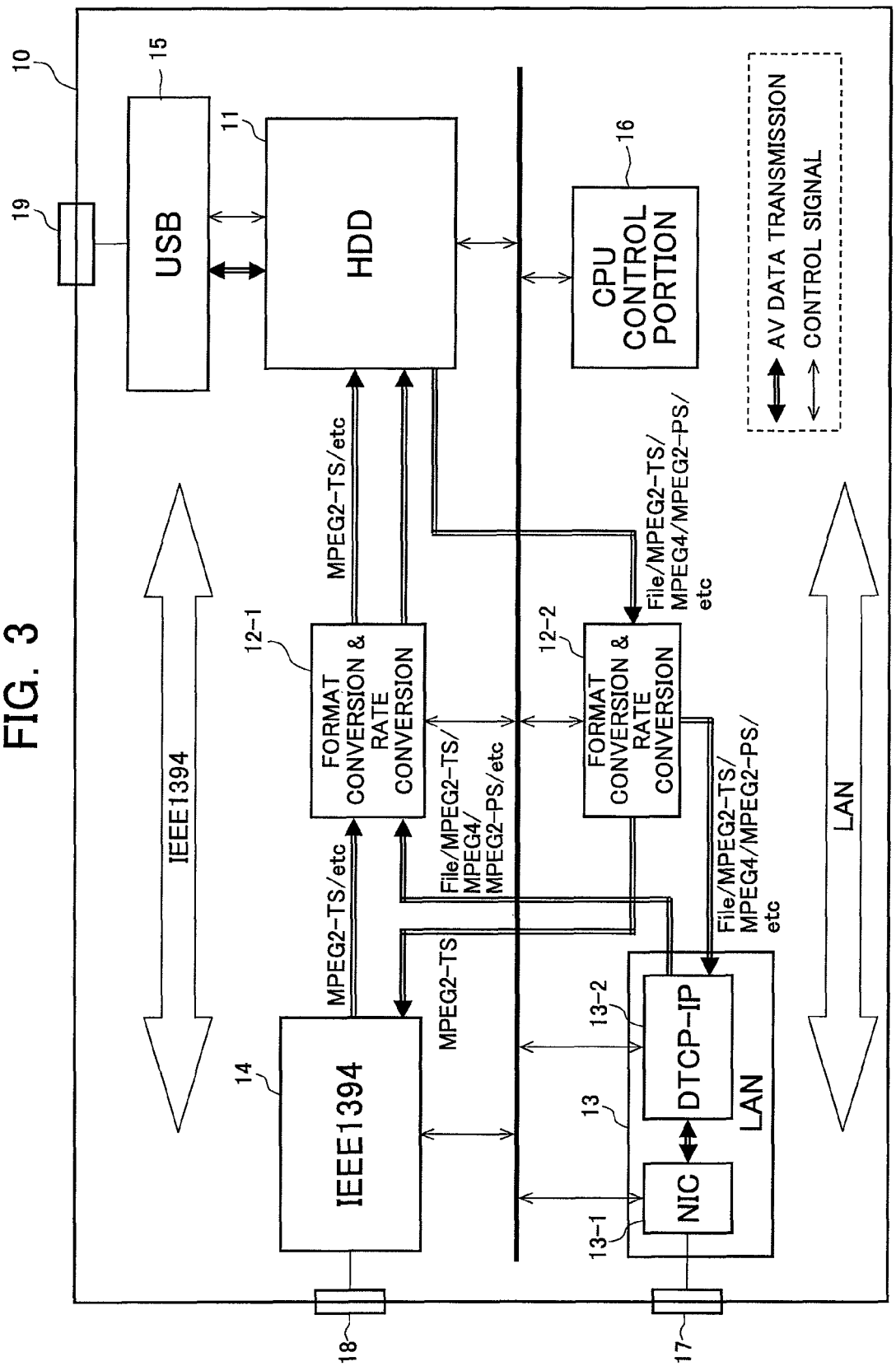
FIG. 3 is a block diagram showing a basic configuration of a server according to an embodiment of the present invention.

FIG. 3 shows a functional block diagram of the AV server device 10 according to an embodiment of the present invention. The AV server device 10 includes an HDD 11 which is a content recording portion, a format conversion portion 12-1 for converting a format of a received content into a predetermined format according to an instruction from a control portion of a CPU (Central Processing Unit) 16, a format conversion portion 12-2 for converting a format of a content to be transmitted into a predetermined format according to an instruction from the CPU 16, a communication interface 13 that comprises an NIC 13-1 incorporating a DTCP-IP module 13-2 and conforms to a LAN, a communication interface 14 of an IEEE1394 standard, a USB interface 15 for connecting external apparatuses such as a PC directly to the HDD 11, and the CPU 16. In addition, the AV server device 10 includes a LAN terminal 17, an IEEE1394 terminal 18, and a USB terminal 19 corresponding respectively to each of the communication interfaces 13, 14, and 15. Note that, in the present embodiment, although there is one communication interface and one terminal corresponding thereto respectively, a plurality of equivalents may be included. Moreover, an interface for directly connecting with the HDD 11, in addition to the USB, may be ones corresponding to PLC (Power Line Communications: high-speed power communications), ZigBee which is a wireless communication standard formulated for home appliances, a wired LAN, an infrared ray, an HDMI, a PCI, a SCASI, a SATA, an ATA, and may also be one corresponding to a DLNA.

The AV server device 10 made up as described above starts an operation corresponding to the request when there is a request from various digital information apparatuses connected to the LAN terminal 17, the IEEE1394 terminal 18, and the USB terminal 19.

The format conversion portion 12-2 is one for converting a content to be reproduced and output into a format that can be reproduced by a client apparatus of a transfer destination, and in the present embodiment, the format conversion portion 12-1 and the format conversion portion 12-2 are also provided with a function of performing transmission rate conversion according to decoding capability of a transfer destination apparatus or a usable band of a transmission path. Note that, although the format conversion portions are illustrated differently on a reproduction and output side and a receiving side to be seen easily, the both may be common. In addition, a time counter may be included for adding time information in converting a content of MPEG 4 taken from a PC through a USB into MPEG 2.

The communication interface 13 conformed to the LAN standard includes the NIC 13-1 and the DTCP-IP module 13-2, and when the content recorded in the HDD 11 is reproduced and output through the IEEE1394, data conversion processing such as encoding is performed to be compliant with each standard of the DTCP-IP.

When there is a request instruction from an external apparatus, the CPU (Central Processing Unit) 16 executes a series of processing/commands in accordance with each program for executing processing in recording content data in the HDD 11 and processing in reproducing and outputting the content recorded in the HDD 11. Each of the programs is stored in a not-shown ROM or a flash memory.

Figure 4:
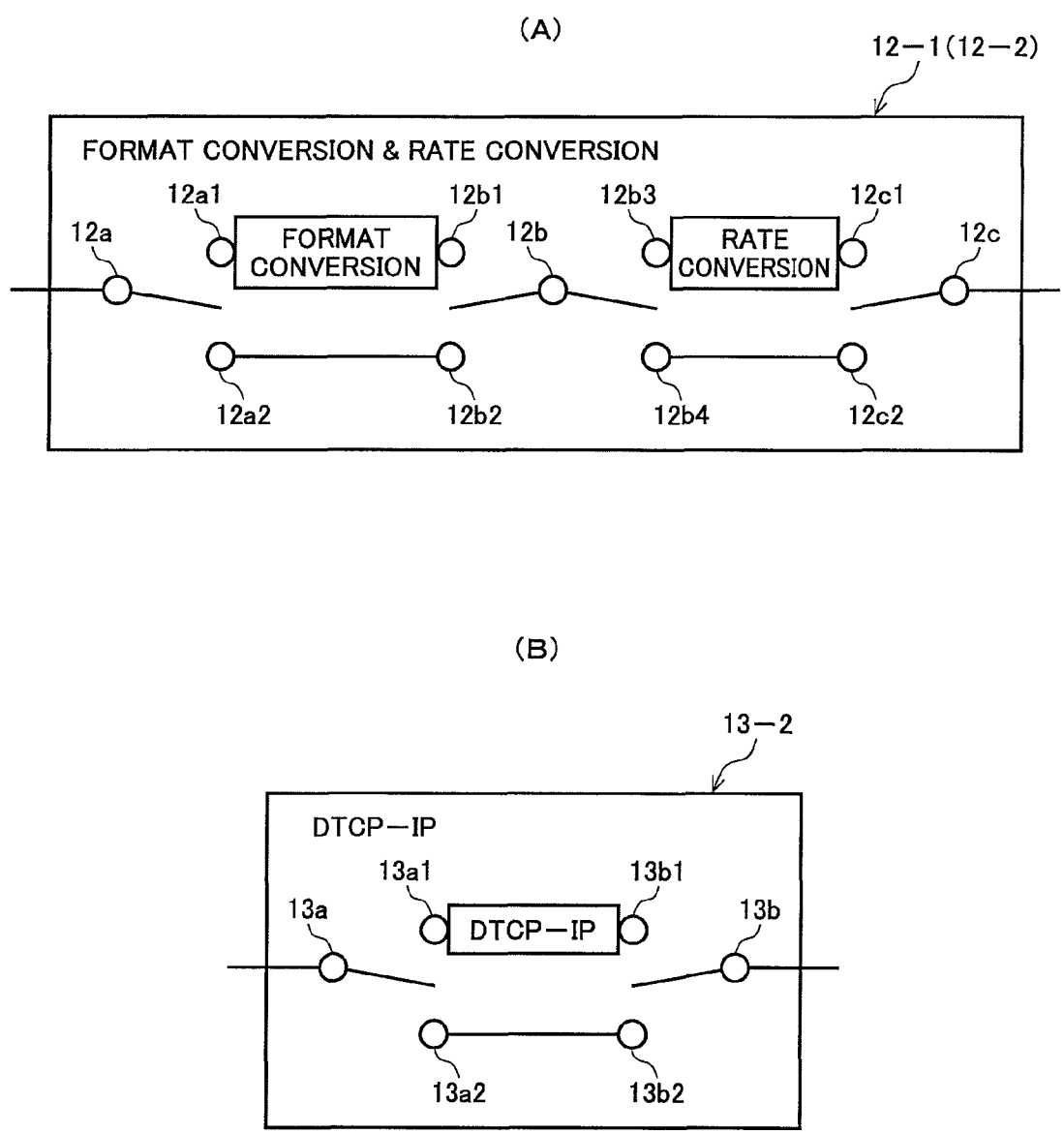
FIG. 4 (A) is an explanatory diagram relating to change of AV data transmission circuits in a format conversion portion, and (B) is an explanatory diagram relating to change of AV data transmission circuits in DTCP-IP.

FIG. 4 (A) is an explanatory diagram relating to change of AV data transmission circuits in the format conversion portion 12-1 (12-2), and three changing-over switches 12a, 12b, and 12c are provided as shown in the figure, and switching control is performed between the case where format conversion is performed and the case where format conversion is not performed, and between the case of rate conversion is performed and the case of being not performed by an instruction from the control portion of the CPU 16. For example, in a case where a format of a content received by the communication interface 14 (IEEE1394) is MPEG2-TS and it is possible to directly write the received content in the HDD 11, the changing-over switch 12a is shifted to a terminal 12a2 side and a format conversion side of the changing-over switch 12b is shifted to a terminal 12b2 side respectively, and since rate conversion is not performed in the case of receiving, a rate conversion side of the changing-over switch 12b is shifted to a terminal 12b4 side and the changing-over switch 12c is shifted to a terminal 12c2 side, respectively. Moreover, in the case of reproduction and output, the changing-over switch 12c is shifted to a terminal 12c1, a rate conversion side of the changing-over switch 12b is shifted to a terminal 12b3 side, a format conversion side thereof is shifted to 12b1, and the changing-over switch 12a is shifted to a terminal 12a1 side, respectively, when the rate conversion and the format conversion are performed.

FIG. 4 (B) is an explanatory diagram relating to change of AV data transmission circuits in the DTCP-IP13-2, changing-over switches 13a and 13b are provided respectively on input/output sides, and when authentication of the DTCP-IP is required by an instruction of the CPU 16, the changing-over switches 13a and 13b are shifted to a terminal 13a1 side and 13b1 side, respectively, and when authentication of the DTCP-IP is not required, the changing-over switches 13a and 13b are shifted to a terminal 13a2 side and 13b2 side, respectively.

In recording of a content in the HDD 11, for example, as shown in FIG. 5 (A), directories (LAN, IEEE1394, and file) are sorted according to a recording source (root). A content from a USBPC is recorded as a "file1". FIG. 5 (B) shows an example of sorting regions for recording according to recording sources (root LAN, root IEEE1394, and root, etc) in recording in the HDD.

As attribute information to be added to list information of a content, for example, as shown in FIG. 6, in addition to a file name of a content, a type of recording source interface (IEEE1394, LAN, etc.), format information of a content (MPEG2-TS, MPEG4, MPEG2-PS, MPEG4, etc.), copyright protection information (copying permitted, copying not-permitted, copying only once permitted, etc.), an authentication method of copyright protection (DTCP, DRM (Digital Right Management) such as DTCP-IP, etc.) and the like are employed.

FIG. 7 shows an example of judging whether or not reproduction and output is possible from attribute information of a content, a type of an output destination interface and DRM on the assumption that a type of recording source interface and a type of an output destination interface are IEEE1394 and LAN (an authentication conforms to the DTCP-IP). For example, when both the recording source and the output destination are IEEE1394 and authentication of DTCP is "authenticated", all are "output possible" irrespective of copyright protection information. Even when both the recording source and the output destination are IEEE1394, in a case where authentication of DTCP is "not authenticated", only the case where the copyright information is "free" is to be "output possible".

In addition, when the recording source is IEEE1394, the output destination is LAN, and authentication of DTCP-IP is "authenticated", all are "output possible" irrespective of copyright protection information. When the recording source is IEEE1394, the output destination is LAN, and authentication of DTCP-IP is "not authenticated", only the case where the copyright information is "free" is to be "output possible". The case is not made clear under the current IEEE1394 standard, however, since there is no problem even if transferring a free content not having copyright protection information, it is determined to be "output possible".

In addition, when both the recording source and the output destination are LAN and authentication of DTCP-IP is "not authenticated", only the case where the copyright information is "free" is to be "output possible" similarly.

FIG. 8 is a flowchart showing one example as to processing at the time of reproduction. When there is a reproduction request of a certain content from an external apparatus which is connected to the present device, first, at step S1, whether or not transmitting the content is permitted by the communication interface which reproduces and outputs the content under a rule of a recording source communication interface of the content is judged from presence/absence of authentication of DRM such as DTCP-IP and the like based on attribute information of the content that is recorded in the HDD 11. For example, it is judged to be "output possible" (in the case of YES at S1) for the case where the recording source is the IEEE1394 and the communication interface for reproducing and outputting is also the IEEE1394, since transmission is not prohibited for the case. On the other hand, for example, it is judged to be "impossible" (in the case of NO at S1) when transmission of the content is prohibited under the standard of the communication interface for reproducing and outputting, for example, the IEEE1394, or the case where the communication interface is unknown one, and reproduction and output of the content is not performed.

In the case of a content which may be transmitted by the communication interface, the flow goes to step S2, and when presence/absence of copyright protection information in the content is checked similarly from the attribute information and when there is copyright protection (in the case of YES at S2), authentication of copyright protection is performed at step S3 and the flow goes to step S4. When authentication of copyright protection is successful and output of the content is judged to be possible at step S4 (in the case of YES at S4), the flow goes to step S5. When authentication of copyright protection is failed and output of the content is impossible for any reason at step S4 (in the case of NO at S4), reproduction and output of the content are not performed.

When output of the content is possible (in the case of YES at S4), at step S5, whether the content can be converted into a format receivable by a reproduction requesting apparatus is checked, and when conversion is possible (in the case of YES at S5), format conversion of the content is performed at step S6. When conversion into a format receivable by the reproduction requesting apparatus is impossible at step S5 (in the case of NO at S5), reproduction and output of the content is not performed.

After performing format conversion of the content at step S6, whether or not there is a sufficient transmission band of an interface which outputs the content is judged and when there is a sufficient transmission band at step S7 (in the case of YES at S7), reproduction and output of the content is performed as it is. When the transmission band is insufficient (in the case of NO at S7), whether or not an output rate of the content can be changed is judged and when changing is possible at step S8 (in the case of YES at S8), the output rate change is executed in accordance with the transmission band, and reproduction and output of the content is performed at step S9. When the output rate of the content can not be changed at step S8, reproduction and output of the content is not performed.

Figure 9:
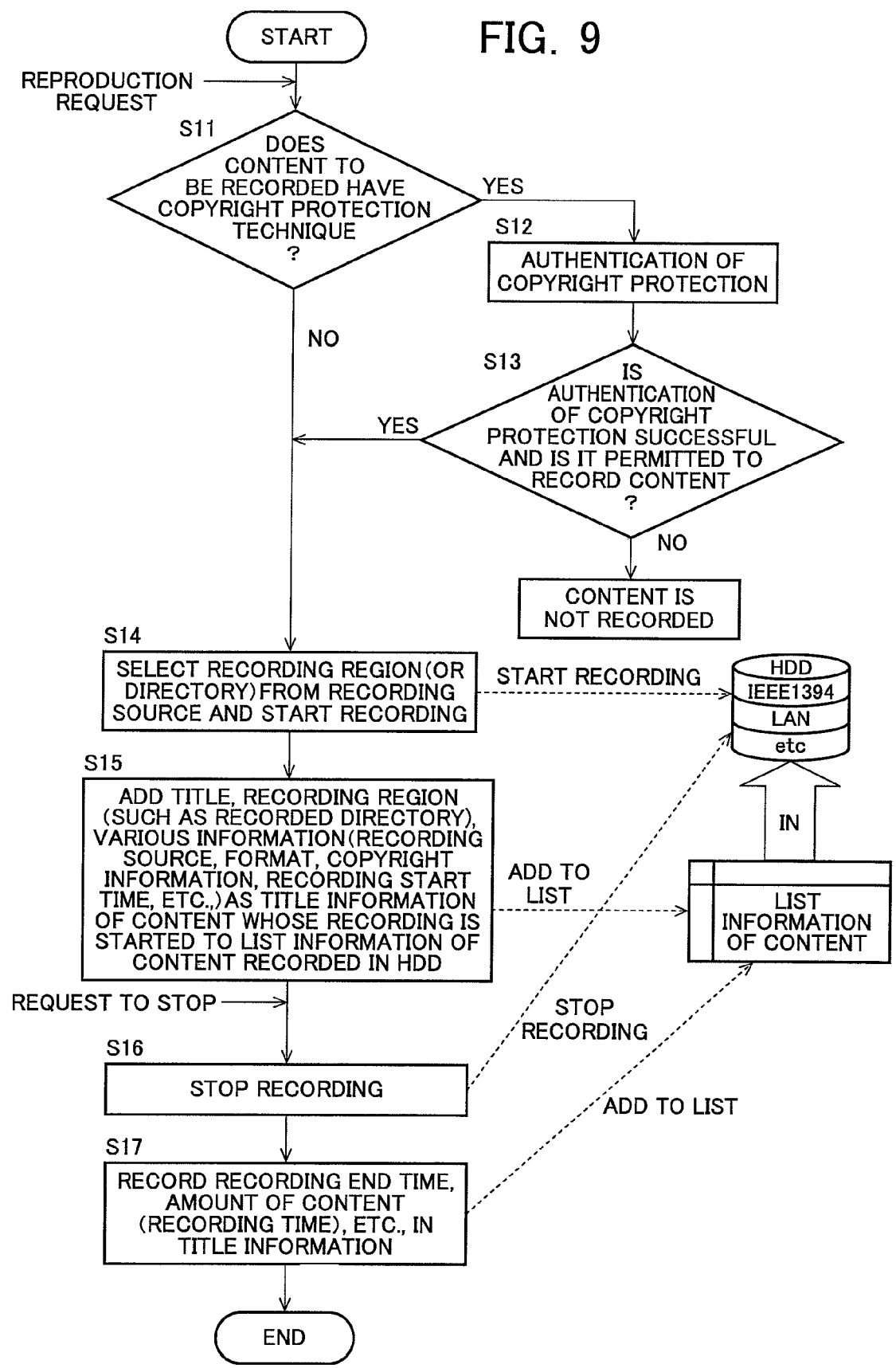
FIG. 9 is a flowchart showing one example as to processing at the time of recording.

FIG. 9 is a flowchart showing one example as to processing at the time of recording. When there is a recording request from the external apparatus which is connected to the present device, whether or not there is copyright protection for a content to be recorded at step S11 is checked, and when there is copyright protection (in the case of YES at S11), authentication of copyright protection is performed at step S12, and when the authentication is successful and recording of the content is judged to be possible (in the case of YES at S13), the flow goes to step S12, and a recording region (or a directory) is selected from a recording source and recording is started. When the authentication is not successful or recording of the content is impossible at step S13 (in the case of NO at S13), recording of the content is not performed.

When recording of the content is started, at step S15, a title, a recording region (recorded directory, etc.), and various information (a recording source, a format, copyright protection information, recording start time, etc.), and the like are added to list information of the content which is recorded in the HDD 11 as title information of the content whose recording is started. When a recording stop is requested from the requesting apparatus, the recording is stopped (S16), and at step S17, recording end time, amount of the content (recording time), and the like are recorded in title information, and ends processing.

Figure 10:
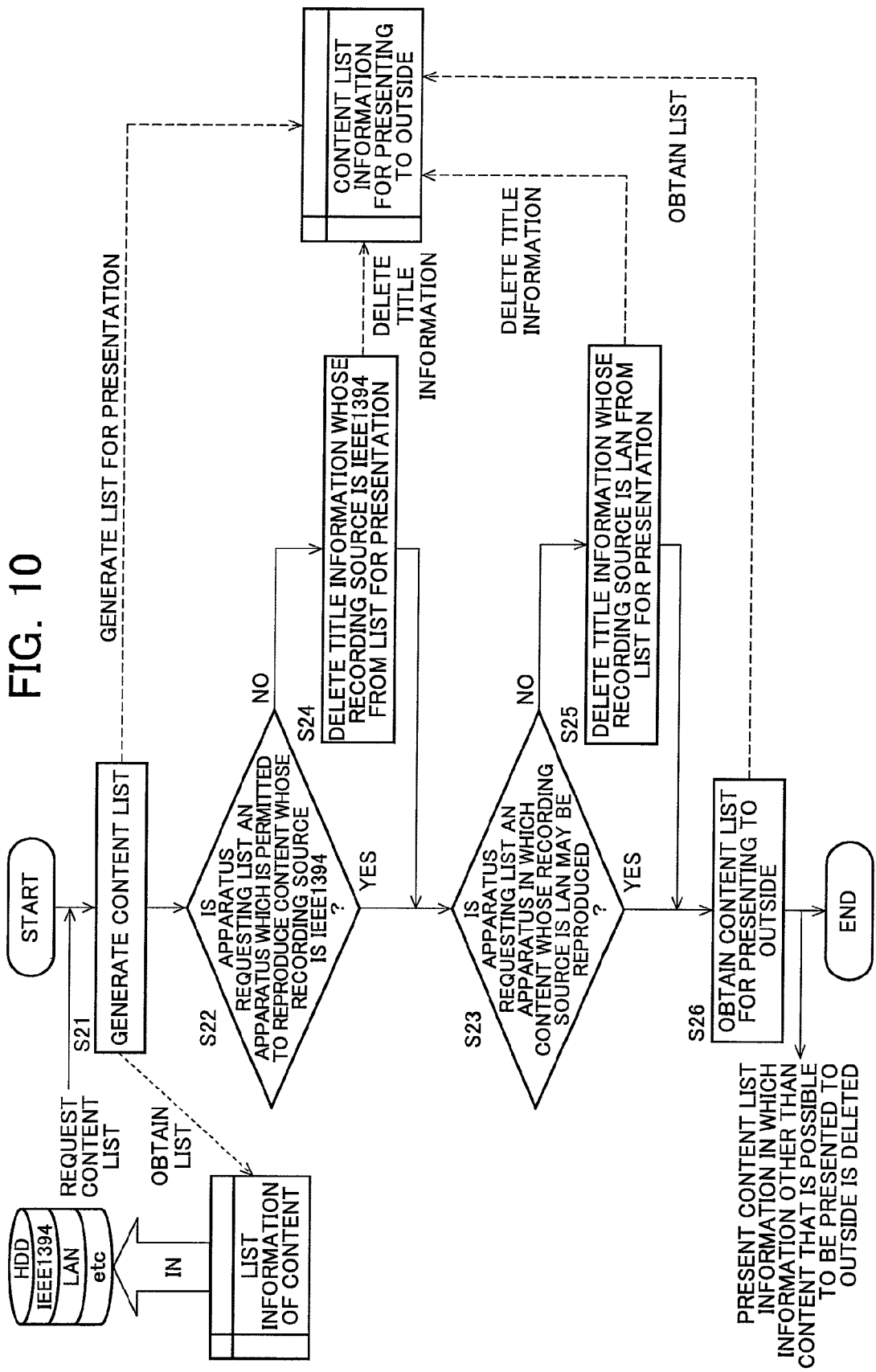
FIG. 10 is a flowchart showing one example as to processing at the time of providing a list of a content recorded in the HDD.

FIG. 10 is a flowchart showing one example of processing at the time of presenting a list of a content recorded in the HDD 11. When there is a request of a content list from the external apparatus, a content list is generated by obtaining content list information including the above-described attribute information at step S21, the flow goes to step S22, and it is judged whether or not the external apparatus requesting the list is an apparatus which is permitted to reproduce a content whose recording source is the IEEE1394. When the apparatus is judged to be permitted to reproduce the contents (in the case of YES at S22), it is further judged whether or not the external apparatus is an apparatus which is permitted to reproduce a content whose recording source is the LAN at step S23. When the external apparatus requesting the presentation of the content list is judged to be an apparatus which is not permitted to reproduce the content whose recording source is the IEEE1394 at step S22 (in the case of NO at S22), title information whose recording source is the IEEE1394 is deleted from the list for presentation at step S24, and then the flow goes to step S23. Moreover, when the external apparatus requesting the presentation of the content list is judged to be an apparatus which is not permitted to reproduce the content whose recording source is the LAN at step S23 (in the case of NO at S23), title information whose recording source is the LAN is deleted from the list for presentation at step S25, and the flow goes to step S26. At step S26, a content list for presentation to the outside in which title information of a content which can not be presented is deleted is obtained, the content list is presented to the requesting apparatus, and processing is ended.

Figure 11:
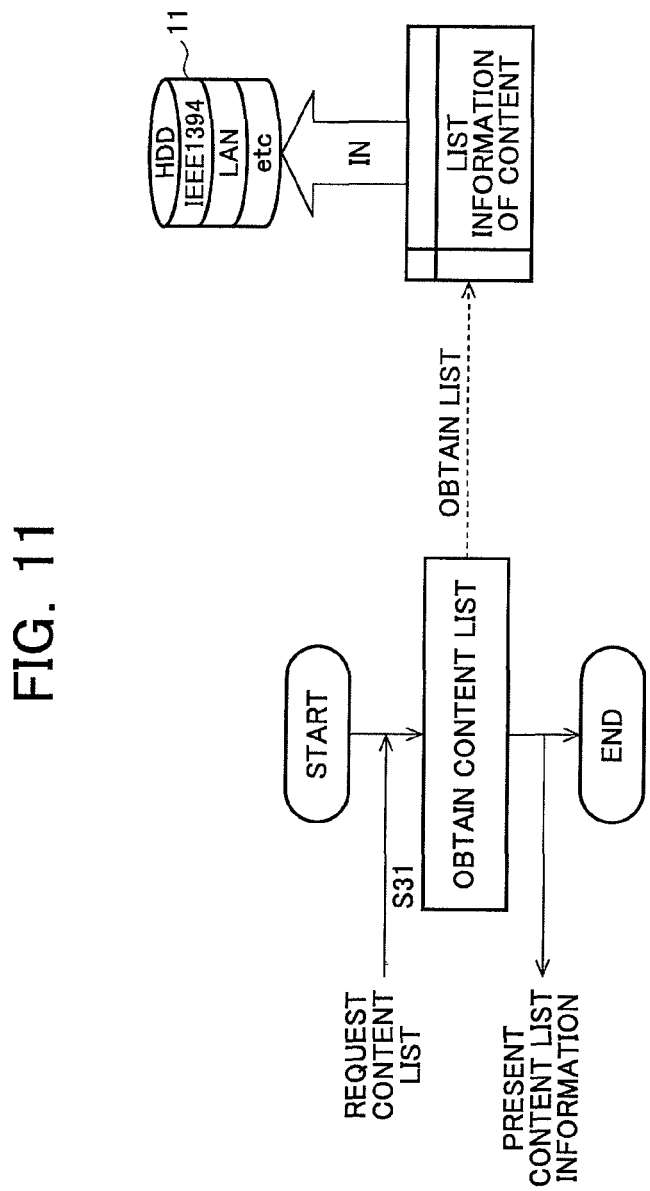
FIG. 11 is a flowchart at the time of providing a list when whether or not reproduction and output are possible is judged on a requesting client side.

FIG. 11 shows a flowchart at the time of presenting a list when whether or not reproduction is possible is judged on a reproduction requesting side, and in this case, when there is a request for presenting a content list from the external apparatus, content list information is obtained from the HDD11 (step S31), and processing for presenting the content list information including all title information is performed to the requesting apparatus.

FIG. 12 is a diagram showing an example of a content list to be presented to the outside, and shows a case where the content whose recording source is the LAN is possible to be reproduced, but the content whose recording source is the IEEE1394 is impossible to be reproduced. That is, after deleting title information whose recording source is the IEEE1394 from an original content list before the deletion, content list information that is possible to be presented to the outside is reproduced.

The embodiment described above shows the example where the content is recorded in the HDD as a file, however, it goes without saying that the present invention includes one in a case where the content is transmitted/received as streaming.

Note that recording means in the AV server of the present invention is not limited to the HDD, and may be a semiconductor memory such as a flash memory.

The invention claimed is:

1. An AV server device to which a plurality of external apparatuses are connected, including a content recording portion for recording content received from the external apparatuses, and outputting the content recorded in the recording portion for a request from the external apparatuses to the external apparatuses, comprising:
   two different communication interfaces each having a different interface communication standard and copyright protection authentication function to which the external apparatuses are connected, the two different communication interfaces including an input communication interface for receiving the content and an output communication interface for outputting reproduced content;
   a controller configured to record the received content and attribute information including at least information of a standard of a communication interface of the input communication interface of a recording source of the content, presence or absence of copyright protection information, and an authentication method of copyright protection if there is copyright protection (DRM),
   said controller further configured to judge whether reproduction of the content is possible based on the attribute information including specification information of the standards of the communication interfaces extracted from the external apparatuses information,
   responsive to presence of copyright protection information, said controller being further configured to authenticate the content based on the authentication method and said controller further configured to judge whether reproduction is possible based on successful authentication,
   said controller further configured to judge whether the content can be converted into a format receivable by the external apparatus requesting the content and, in response to a positive judgment, formatting the content into a format receivable by the external apparatus requesting the content;
   said controller further configured to judge whether there is sufficient bandwidth to carry the reformatted content in the communication interface used for output;
   responsive to the controller judging that there is sufficient bandwidth, outputting the reformatted content via the output communication interface.

2. The AV server device as defined in claim 1, further comprising:
   a format converter configured to convert formats of a received content and a content to be transmitted according to an instruction from the controller in transmitting or receiving the contents.

3. The AV server device as defined in claim 2,
   the format converter configured to convert the content to be transmitted into a format which can be received by an output requesting apparatus.

4. The AV server device as defined in claim 2 or 3,
   the format converter configured to perform rate conversion conforming to a transmission band of an output destination according to an instruction from the controller.

5. The AV server device as defined in any one of claims 1 to 3, wherein
   the two interfaces conform to an IEEE1394 standard and a DLNA standard.

6. The AV server device as defined in any one of claims 1 to 3, wherein
   when a format of a content received from the external apparatuses is MPEG2-TS, the content is recorded directly in the content recording portion.

7. The AV server device as defined in any one of claims 2 to 3, wherein
   when a format of a content received from the external apparatuses is the MPEG2-TS, the content is converted into a predetermined format in the format converter, and then recorded in the content recording portion.

8. The AV server device as defined in any one of claims 1 to 3, wherein
   when a format of a content received from the external apparatuses is other than the MPEG2-TS, the content is recorded directly in the content recording portion.

9. The AV server device as defined in any one of claims 2 to 3, wherein
   when a format of a content received from the external apparatuses is other than the MPEG2-TS, the content is converted into a predetermined format in the format converter, and then recorded in the content recording portion.

10. The AV server device as defined in any one of claims 1 to 3, wherein
    a communicate interface which conforms to any one of a USB standard, an IDE/ATA standard, a serial ATA standard, and an SCSI standard or a plurality of the standards is further included as a communication interface to which external apparatuses are connected.

11. The AV server device as defined in any one of claims 1 to 3, wherein
    when there is a request for presenting the content information recorded in the content recording portion and a list of the attribute information according to the content from the external apparatuses connected through the communication interface, the controller is configured to output only the list information according to a content which is receivable in communication interface standard rule information based on the external apparatus information.

12. A TV receiver incorporating an AV server incorporating any one of the AV server devices as defined in claims 1 to 3, the TV receiver also including a TV tuner.

13. A personal computer incorporating an AV server incorporating any one of the AV server devices as defined in claims 1 to 3, the personal computer also including a personal computer body.

* * * * *